Oct. 18, 1955

H. A. QUIST 2,720,888

REVERSED PRESSURE ACTUATED VENT VALVE

Filed July 17, 1951

INVENTOR.
HAROLD A. QUIST

BY

*Busser and Harding*

ATTORNEYS

Oct. 18, 1955 H. A. QUIST 2,720,888
REVERSED PRESSURE ACTUATED VENT VALVE
Filed July 17, 1951 7 Sheets-Sheet 3

INVENTOR.
HAROLD A. QUIST
BY
Busser and Harding
ATTORNEYS

Oct. 18, 1955     H. A. QUIST     2,720,888
REVERSED PRESSURE ACTUATED VENT VALVE
Filed July 17, 1951     7 Sheets-Sheet 4

INVENTOR.
HAROLD A. QUIST
BY
ATTORNEYS

Oct. 18, 1955 H. A. QUIST 2,720,888
REVERSED PRESSURE ACTUATED VENT VALVE
Filed July 17, 1951 7 Sheets-Sheet 5

*INVENTOR.*
HAROLD A. QUIST
BY
Busser and Harding
ATTORNEYS

Oct. 18, 1955      H. A. QUIST      2,720,888
REVERSED PRESSURE ACTUATED VENT VALVE
Filed July 17, 1951      7 Sheets-Sheet 6

INVENTOR.
HAROLD A. QUIST
BY
ATTORNEYS

United States Patent Office 2,720,888
Patented Oct. 18, 1955

2,720,888

REVERSED PRESSURE ACTUATED VENT VALVE

Harold A. Quist, Swarthmore, Pa., assignor to Sun Oil Company, Philadelphia, Pa., a corporation of New Jersey Application July 17, 1951, Serial No. 237,125

13 Claims. (Cl. 137—250)

This invention relates in general to venting devices for liquid storage tanks and specifically to pressure-operated relief valves of the oscillating type responsive to either pressure or vacuum conditions in the storage tanks on which they are mounted.

As stated, the invention relates to a pressure and vacuum relief device for liquid storage tanks, which finds particular utility in the fields of oil refining and chemical industries. It is the practice, particularly in the petroleum refining industry, to vent storage tanks primarily to save the equipment from damage and secondarily to conserve the stored liquids, usually volatile in nature.

Early relief devices of simple construction were modified and improved to insure maximum protection for the equipment. Later, the effort to conserve the stored contents of the tank introduced many and varied types of sealed valves. In the liquid seal type of valve, the movable valve member is placed within a body of liquid and the valve assembly mounted on a tank in communication with the liquid storage space to respond to pressure changes within the tank.

One type of venting device used for this purpose and which conforms with the above description, is the rocking or oscillating valve. An inverted cup is operably suspended in sealing contact with a liquid above a pressure transmitting conductor connecting the tank to the under side of the cup. The cup operates as a valve and oscillates in opposite directions about a supporting axis to relieve pressure and vacuum conditions in the tank.

Normally this form of relief or breather valve is operated in direct response to the pressure differential resulting between the tank pressures transmitted to the valve member and the tendency to remain stationary due to inertia and friction resistance. Consequently, the usable pressure developed in the tank is always reduced by the amount necessary to overcome these restraining components. It is an object of this invention to provide a venting device in which the tank pressure is used as the operating medium at substantially its full force and the effect of the restraining force components reduced to a minimum.

Attempts have been made to increase the efficiency of this type of relief valve by either designing the valve member to receive the tank pressure at a point on the valve to increase the force movement, or by use of a lever system for the same purpose. In the first instance where the tank pressure is directed to a peripheral chamber on the valve member, the operating force is increased but the portion of the force required to overcome the restraining forces is, necessarily, also increased. The resulting operable force component remains, consequently, little increased over the direct contact method.

Where a lever arm system is used to magnify the tank pressure, it is open to all the objections common to such systems. The tendency to become misaligned, clogged, frozen, or separated has been, in the case of relief valves, primary in supplanting these systems with other means. In addition, the added weight of the levers and their connectors requires additional pressures for operation.

In both conditions mentioned, mechanical adjusting means are necessary to return the suspended reciprocable valve member back to a neutral position after operation. This is done by the use of weights adding to the normal restraining forces mentioned. Where weights are used for operation and balancing, the valve member is, of necessity, designed to respond immediately to slight differences in tank pressures. A deliberate and positive response to pressure differences is sacrificed to insure operation under all conditions of excessive pressure and vacuum. A too frequent operation therefore occurs, often amounting to chattering, depending on the pressure difference required for operation. Also, the effect of any collection of foreign material or external pressure on the valve member such as ice, wind, small animals or insects, is to destroy the responsiveness of the valve entirely. It is a further object of this invention to provide a pressure responsive relief valve, balanced under all conditions of tank pressure, but which will respond immediately and precisely to predetermined excessive increase and decrease of pressure conditions therein.

A further objection to relief or breather valves of this type is the oscillation in both clockwise and counterclockwise directions depending on the relief of pressure or vacuum conditions. This requirement limits the movement of the valve member and restricts the entrance or exit of the relief gases thereby unduly prolonging the operation or further causing chattering of the oscillating member. Also, the relieving gases are directed against the surface of the sealing liquid due to the restricted opening entraining small quantities in each operation, and thus requiring attention and frequent replenishing of the liquid. Efforts have been made to correct these faults by off-setting the valve member, but with no satisfactory result. It is therefore an additional object of this invention to provide a balanced pressure operated relief valve capable of fully venting either vacuum or pressure conditions in storage tanks without entrainment of the sealing liquid.

In accordance with the present invention, an oscillatory valve member of hollow interior is pivotally mounted in a housing containing a liquid in sufficient quantity to act in sealing relation with the valve member. The neutral position assumed by the valve member when it is not active in venting pressure or relieving vacuum conditions is balanced in contact with the sealing liquid. A relief conduit extends through the housing and liquid volume to a point above the liquid surface and connects the vapor space of the storage tank to which it is attached to the liquid sealed interior of the valve member. Under all pressure variations in the tank, transmitted through the conduit, the valve member remains unaffected in the balanced neutral position.

Connected to the valve member, a pressure responsive mechanism is positioned to oscillate the member in one direction only, in response to the pressure changes in the storage tank. Pressure to operate the valve member is transmitted from the storage tank to the pressure responsive mechanism, by an actuator. The actuator responds to excess pressures in the tank, either pressure or vacuum, and transmits a positive operating pressure to the pressure responsive mechanism. By reversing the pressures delivered to this mechanism, and using atmospheric pressure together with the pressure or vacuum of the storage tank, the valve member is caused to rotate to the relief position in one direction only. Also, the properly selected pressure in operating strength is passed to the valve member responsive mechanism under predetermined operating conditions selected to insure timely and correct operation of the balanced valve.

For a more complete understanding of the nature and scope of the invention in which the above noted objects and others will be evident, reference is made to the following detailed description read in connection with the accompanying drawing in which.

A venting device of the type here considered which will give most satisfactory service, must meet the general requirements of preserving the storage equipment and the stored liquids, as mentioned. The functions of the apparatus necessary to accomplish these general requirements, must be positive in the venting operation for either pressure or vacuum conditions and adjustable to give this positive operation only within predetermined limits. Uncontrolled oscillations of a venting mechanism within an indeterminate range of positive and negative pressures fulfills the first general requirement of saving the equipment from damage, but is expensive as it vents volatile constituents needlessly. Consequently control of the venting operation within predetermined limits of both pressure and vacuum is highly desirable.

According to the present invention, the preferred embodiment of the combined actuator and valve body as well as the alternate forms of the various elements of the combination, eliminate the objections noted in the prior art. It will be recognized that in separating the venting valve member from the actuating mechanism it is possible to regulate the operating response within narrow, consistently maintained limits. The necessary weights, unbalance of design and impetus mediums hitherto used on the valve member to facilitate operation can be eliminated and a balanced member, unresponsive to direct tank pressures through the venting conduit, used in its place. The actuator, not required to vent the storage tank, is practically sealed in its housing, operates in response to small pressure changes and limited gas volumes, and is adjustable to exactly respond to the desired conditions. The actuating element remains operable regardless of normal obstructions such as wind, rain or snow, insects, small animals and gumming tendencies of escaping vapors, common to venting devices.

In the present embodiment, the rocking motion of the valve member in two directions common to relief valves of this type has been eliminated. This overcomes the lag caused by passing the member through a dead center position in alternate response to pressure venting and vacuum relief and permits designing for balance and positive operating characteristics for oscillating in one direction only. The actuator, operating in response to the storage tank pressure, includes all the necessary adjusting elements formerly used directly on the valve member and is designed to transmit either the positive or negative condition of the tank (relative to atmospheric pressure) together with properly directed atmospheric pressure in a manner to operate the valve member. It is evident, therefore, that the valve member is controlled to operate only in response to the actuator mechanism and permits of careful and exact operating adjustment.

Referring now to the drawing for a more detailed and understandable description of the invention where like numerals designate like elements throughout the figures, the numeral 30 is used to indicate the housing for the oscillatory valve member 32. The figures of the drawing may be considered in two general groups wherein Figures 1 to 7 inclusive and 21 and 22 illustrate one embodiment of the device complete as to both detail and operation. The second group comprising Figures 8 to 20 inclusive show alternate forms of combinations and sub-combinations which can readily be substituted in the embodiment of the device previously disclosed. These alternate forms are included to further demonstrate the broad idea of the reverse pressure actuated relief mechanism each having some particular advantage, yet being within the spirit of the invention. This treatment of the idea broadens the teaching of the invention and makes possible a more comprehensive understanding of the structure.

Figure 1:
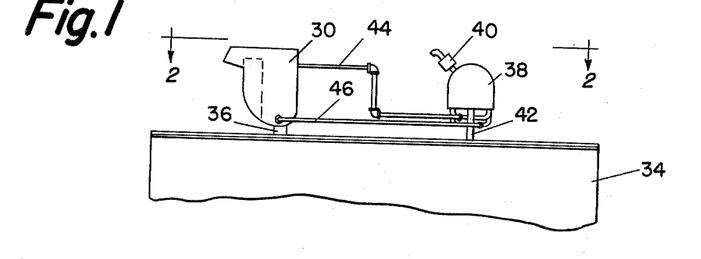
Figure 1 is an elevational view showing the device in operating position.

The diagrammatic elevation of the preferred embodiment pictured in Figure 1 shows the valve member housing 30 mounted on the storage tank 34 and connected therewith by the flue or gas relief conduit 36. The actuator housing 38 with the air drier 40 for protection of the operating parts is shown connected to the storage tank 34 by a conduit 42 which also transmits tank pressures thereto. A drier valve protecting device similar to member 40 above may also be used in the conduit 42 to dry the tank gases, but is not believed necessary under normal condition. Two main conduits 44 and 46 connect the housings 30 and 38 together for operating purposes which will be fully explained later in the specification.

Figure 2:
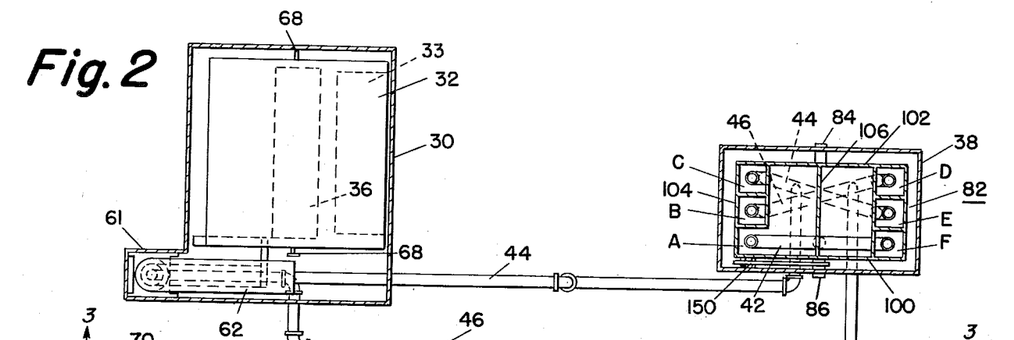
Figure 2 is a plan view in section of Figure 1 along the line 2—2 with the housings opened.
Figure 3:
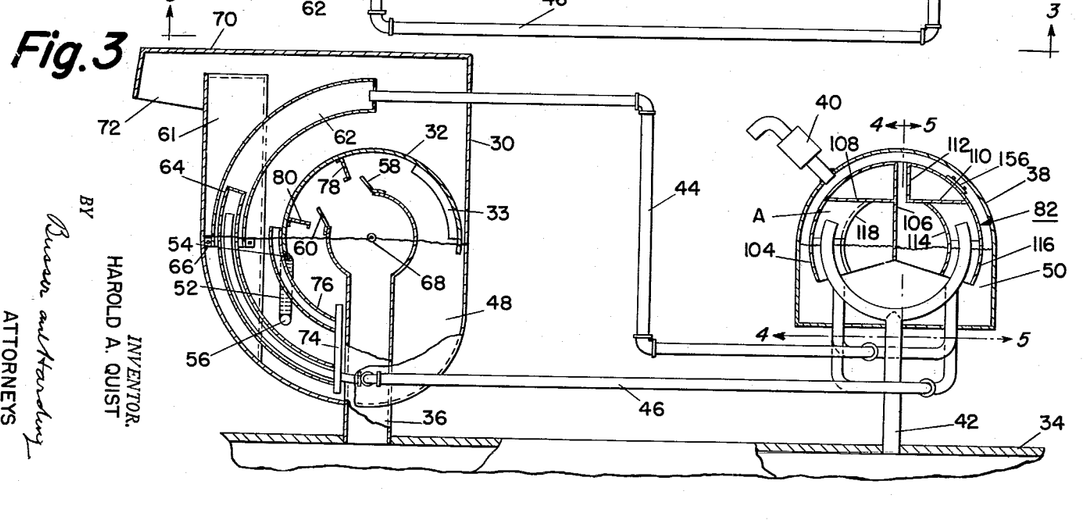
Figure 3 is a sectional elevation view along lines 3—3 of Figure 2, also with the housings opened.

A further understanding of this embodiment of the device will be gained by reference to Figures 2 and 3 on which the elements above detailed are shown with the numerical designations already ascribed to them. Continuing with reference to both these figures, a non-inflammable, non-freezing liquid 48 and 50 is used in the housings 30 and 38 respectively as a sealing liquid and is maintained at operating level by any reservoir system known in the art. Such a liquid supply device is omitted from these drawings for reasons of clarity and is not included as part of the claimed structure.

Narrowing the description for clarity to the oscillatory valve member 32 and its associated elements, these two figures (2 and 3) of the drawings are considered in greater detail. The flue or gas relief transmitting conduit 36 opens into the vapor pressure space of the storage tank 34 and extends upwardly in sealed relation with the housing 30 through the sealing liquid 48 and opens under the body of the semi-cylindrically shaped valve member 32. This valve member 32 is slightly more than semi-cylindrical in section extending sufficiently past the approximate diametrical limit of the half-figure as shown by the level of the liquid 48 passing through the point of pivotal suspension to afford good sealing contact with the liquid. On the trailing edge of this valve member, considering it to open always in a clockwise direction as it is viewed in Figure 3, a flame arrester 52 of the tubular type is hinged as at 54 and weighted as at 56 to remain substantially vertical in all operating positions of the valve member. Further, this flame arrester is of sufficient size to extend fully across the opening in the conduit 36 and also to remain in sealing engagement with the liquid 48 even during the maximum oscillatory movement of the valve member under operating conditions. A weight 33, or similar expedient, is shown as the balancing device to overcome the unbalance of the valve member 32 because of the flame arrester 52 and the later to be described baffle structure.

The venting conduit 36 is cylindrically shaped in the section projecting above the sealing liquid and thus conforms to the internal configuration of the valve member. This shape of the conduit facilitates the passage of the relieving gases in both directions as required for venting pressures and relieving vacuums as this device is designed to do and also faclitates the operating relation of the conduit and the valve member at the liquid level. An upper and a lower gas directioning baffle, members 58 and 60 respectively, are permanently fixed to the conduit 36 at the opening which is made to direct the relieving gases off to one side and neither directly vertically nor horizontally. Placement of the venting opening in this way directs the streams of gas inwardly or outwardly to pass without undue turbulent contact with the valve member 32 and also sufficiently in the upward direction to avoid unnecessary contact with the sealing liquid thereby decreasing the depletion of that liquid through entrainment. It further channels the relief gases into a stream for interception by the flame arrester 52. A cover 70 protects the housing 30 from rain, snow and wind effects, and directs the relieving gases through the opening 72.

In order to reciprocate the valve member 32 and thus permit the relief of pressure and vacuum conditions through the conduit 36 as above indicated, the housing 30 is extended on one end to the enlarged portion 61 which provides for a chamber 62 and a piston 64 for pressure operation. The chamber is rigidly fixed in the extension 61 of the housing 30 as at 66 to position the open, lower end beneath the surface of the sealing liquid 48 and extends upwardly in an arc about the pivotal point of axial suspension 68 a sufficient distance to permit free movement of the piston 64 through the required arcuate distance. The upper end of the chamber 62 is closed in sealing engagement with the conduit 44 thereby connecting it with the actuator housing 38 to receive operating pressures.

Positioned to freely move in reciprocation within the chamber 62, the piston 64 is suspended by the brackets 74 and 76 from the valve member 32 to enclose the arcuately fashioned extension of the conduit 46. This extension of the conduit 46 is arced about the pivotal suspension point 68 as a center to facilitate the reciprocative movement of the piston 64 and extends along this arc through the housing extension 61 until it opens into the piston 64 above the liquid level. It will be understood that this forms the pressure responsive mechanism for operation of the valve member which is facilitated by the baffles 78 and 80 projecting inwardly from the valve member 32 to be fully described in operation later.

The description given immediately above is confined to the oscillatory valve member 32 and the auxiliary elements associated with it in and immediately adjacent the housing 30. Still considering the Figures 2 and 3, attention is now directed to the actuator mechanism enclosed in and cooperating with the housing 38. Although the original reference is here made to Figures 2 and 3 for the description of the actuator which causes the relief valve mechanism to operate by reverse pressures, the additional Figures 4 through 7 inclusive will also be considered.

Starting with the Figures 2 and 3, it is clear that the actuator housing 38, vented to the atmosphere through the drier 40, is partially filled with a sealing liquid 50 to form a liquid surface substantially at the pivoting axis of the oscillatory actuator member 82. The pivotal suspension points for this member 82 are indicated as knife edge supports in Figure 6 and are designated as 84 and 86. The pivotally supported member 82 is also a semi-cylindrical member of more than half a cylinder extended for purposes of contacting the sealing liquid to sufficient depth to prevent escape of pressure previous to actuation.

Figure 4:
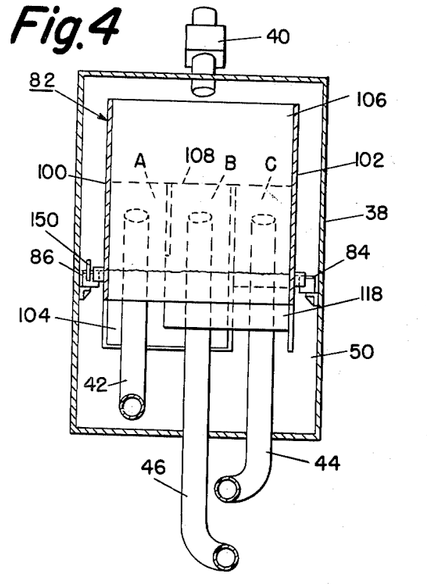
Figures 4 and 5 are sectional elevations of the actuator mechanism taken along lines 4—4 and 5—5 of Figure 3.
Figure 5:
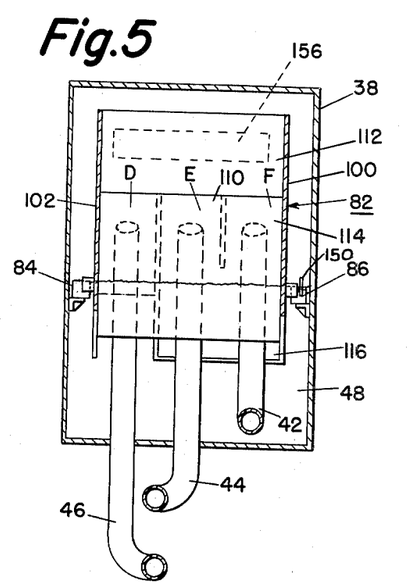

The sectional plan view illustrated in Figure 2 shows the semi-cylindrical member 82 to include a number of compartments, balanced on each side of the pivotal axis, positioned longitudinally of the member and separated from each other and the interior of the housing 38 by partitions of varying lengths and depths (see also Figures 4 and 5). In Figure 2, to facilitate further discussion and complete understanding of the operation of this element, these compartments are lettered A, B, and C on the left side of the device, front to rear; and D, E, and F on the right side, rear to front.

To avoid confusion in further detailing the compartmented actuator member shown by the inclusive number 82, and particularly for later reference to operations, it is necessary to clarify the structure by specifically labeling the partitions. As far as possible, the numerical and letter designations now assigned will be retained throughout this specification for the now detailed embodiment and the alternate forms as well. The actuator member 82 is in the form of a compartmented, inverted cup of semi-cylindrical sectional shape. As viewed in Figures 2 and 3 (and for all other figures, including the alternate forms as well) to refer to the general division of this member as right and left, and front and rear, is believed to make the description more understandable. With this general division, it is believed that descriptive numbers, together with the letters already assigned, will clarify the structure.

The front end closure of the member 82 is designated as 100 and the rear closure as 102, numbered on Figure 2. The outer wall 104 to the left of the medial partition 106 is supported by the chord 108 which also restricts the volume of the left compartments A, B, and C. A similar chord 110 connects a channel forming section 112 spaced from the medial partition 106 to admit atmospheric pressure into the right half of the member 82 but separated from the compartments D, E, and F by the inner partition 114. The outer wall to the right of the figure is designated as 116 and extends from 112 to the bottom of the member. A similar inner partition 118 is incorporated on the left half of the member, but extends only across the compartments B and C leaving compartment A open to the volume within the chord 108, the medial partition 106 and the liquid level 50. For further designation of the small separating partitions between compartments, these will be noted as compartments partitions A—B, B—C, etc. With this numerical and lettered designation, it is believed further description will be clearly understood.

A double section of the actuator is illustrated in Figures 4 and 5 taken as indicated by the sectional lines 4—4, 5—5 shown on Figure 3. Figure 4 represents therefore the left side, with the front end closure 100 to the left of the figure and the rear closure 102 to the right of that figure. The sectional elevation of Figure 5, following these figures, will be understood. The section to the left is taken to include the medial partition 106, and shows the inner partition 118 and the left outer wall 104. The right section shown in Figure 5 shows the inner partition 114 extending downwardly from the chord 110 and the right outer wall 116. It will be noted that the outer wall partitions 104 and 116 extend the full length of the cylindrical arc over the compartments A and B on the left and E and F on the right, but do not extend to this depth for the rear compartments C and D on the left and right sides respectively. Again, the partitions between the respective chambers extend the full depth in the liquid except those between the first two chambers on the left and right sides, A—B, and E—F respectively. The one remaining difference has already been mentioned, but will be repeated here to collect all the partition information in one location, namely the inner partition 118 is not extended over the chamber A, but does enclose chambers B and C.

Further examination of these figures of the drawing, shows two weights operable with the actuator under discussion. The weight 150 is of bar shape in this embodiment, and in the neutral actuator position rests with one end supported by the knife edge pivot 86 on which the actuator rests and the other end supported by the fixed rest 152. The position assumed under this neutral position is substantially horizontal and touching the liquid surface indicated in Figures 4 and 5. Transverse the housing 38, the weight 150 is between the front end 100 and the wall of the housing 38 as illustrated in Figure 2. An engaging lug 154 is adapted to contact the weight as the actuator member 82 moves in a clockwise direction on its pivotal supports, but leave the weight 150 undisturbed as the member 82 moves counterclockwise.

In addition to this intermittently effectual weight 150, operable under one direction of rotation only, there is an adjustable weight 156, fixed for all intents and purposes to the outer cover 116 of the actuator member and displaced far enough from the vertical center line to always remain effective in returning the member to the neutral position regardless of oscillation in the counterclockwise direction. For fine adjustment, this weight is slotted as at 158—158, and fastened by conventional bolts 160—160 for proper positioning.

The conduit 42 shown in Figures 1 and 3 has been referred to as a means for transmitting tank pressures to the actuator housing 38. It is now evident that the conduits 42, 44, and 46 connect the actuator to the tank 34 and the chamber 62 and the piston 64 of the pressure responsive elements respectively. As these conduits branch to the right and left and also cross over each other, as shown in Figures 2 and 3, to keep the drawings clear, they will be numbered respectively on all views of the actuator and in alternate figures in the same way. Hence, the tank pressure conduit 42 is shown branching to compartments A and F; the chamber 62 connecting with conduit 44 which is shown branching to compartments C and E, while the conduit 46 connecting the piston with the actuator is shown branching to compartments B and D.

A reading of the operation description of this detailed complete embodiment, which is given later, will clarify the placement and uses of these various elements. Undoubtedly, those versed in the art will be able to understand the operation without further explanation. However, to clarify the advantages of this device over the art, operated in the way described, a detailed explanation of the operation will be given. Before taking up this discussion, it is proposed to detail the alternate structures shown in Figures 8 to 20 inclusive. After these figures have been described, their operation and interchangeability with the elements of the detailed embodiment, as well as the separate advantages of each combination and sub-combination, will be clearly understood. Therefore, the description of the operation of this complete embodiment, with a few references to the distinctive features of the alternate devices, will fully encompass the disclosure.

Referring to the Figures 8 to 20 indicated above, the first group of five figures namely 8 to 12 inclusive and the second group of figures namely 13 to 16 inclusive, show two modifications of the actuator assembly. The last group of figures here introduced as an alternate arrangement includes Figures 17 to 20 inclusive and illustrates a simple, inexpensive structure to accomplish the purpose of the complete embodiment with the same principles of operation, but arranged in closely compacted form as an operating combination. The remaining figures of the drawing 21 and 22 have been referred to, and show the operational positions of the device detailed above as a complete embodiment of the invention.

Figure 8:
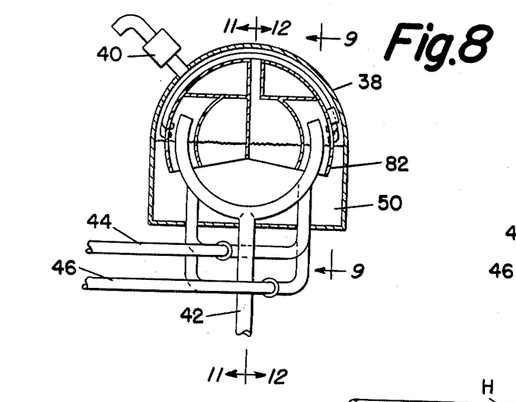
Figure 8 is a sectional elevation of an alternate form of actuator similar to the view in Figure 3 of the sub-combination.
Figure 9:
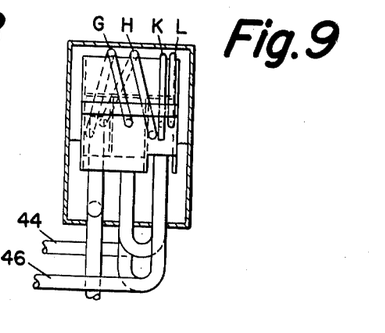
Figure 9 is an elevation of Figure 8 taken along lines 9—9.

The alternate form of actuator assembly shown in Figures 8 to 12 inclusive is numbered as closely to the previously discussed actuator as an embodiment as is possible. Where modifications to the structure are introduced, they will be given different numerical designations to distinguish them from the figures already discussed. In Figure 8, the actuator housing 38 is vented to the atmosphere through a drier 40 to remove moisture from the air and thus preserve the equipment and decrease the effects of condensation. The conduits 42, 44, and 46 serve the same purpose of connecting the actuator to the storage tank, and the chamber and piston of the pressure-responsive device respectively, as described above. The sealing liquid 50 is maintained at effective level to engage the actuator member 82. Compartments A, B, C on the left and D, E, F, on the right are the same as discussed with reference to Figures 4 and 5 except the partitions A—B, E—F extend to contact the liquid and are not foreshortened as already detailed in Figures 4 and 5. The remaining partitions forming this actuator member conform to those already detailed in describing Figures 4 and 5 which shows similar structure to these of Figures 11 and 12. The weights 150 and 156 are used as there shown, but are omitted here except in Figures 10 and 11 for clarity.

Figures 8 to 12 inclusive are distinguished from the previously detailed actuator by the compartments on the left, A and C, being pressure connected to two of the compartments on the right, D and E. These cross connections for transmission of pressure conditions are made, as shown, by tubes bent to closely follow the curved top of the actuator. Referring specifically to Figures 9 to 12 inclusive, the pressure transfer tube G connects compartment A at liquid level to compartment E at a distance P above the liquid. This distance P above the liquid is termed the "play" or "tolerance" distance and is determined at the time of construction to allow for slight oscillatory motion of the actuator caused by uncertain pressure variations before the excessive pressure becomes fully effective. Also, during the closing operation the transfer of pressures between the compartments by means of these tubes as limited by the elevations above the liquid assists in definitely determining the operation and holding the valve member closed once it reaches the neutral or non-relieving position.

Continuing with reference to these Figures 9 to 12 inclusive, the pressure transfer tube H connects compartment A at the predetermined elevation P above the liquid level and crosses over to enter compartment D at liquid level. The two remaining pressure transfer tubes K and L connect compartments C and D in alternate arrangement above and at liquid level as shown. In detailing the operation of the actuator described in Figures 1 to 7, reference will be made to this alternate form describing its operation and advantages.

The next group of four figures (13 to 16 inclusive) shows a further modification of the previously described actuator mechanisms. In this form, the device is made in two separable pieces. The lower part of the housing 180 is adapted to hold the sealing liquid 50 and position the conduits 42, 44, and 46 as well as an additional conduit 182 which is open to the atmosphere through an additional drier 184 similar to drier 40. A peripheral trough 186 to hold a liquid seal 188 forms the upper engaging edge of the housing 180 where it receives a sealing projection 190 and a watershed segment 192 fixed to the periphery of the upper section 194 of the housing. This peripheral sealing detail is shown clearly in section in Figure 13, but is omitted from the remaining Figures 14 to 16 for clearity of the detail.

The upper section 194, in addition to the sealing projection 190 and the watershed segment 192, has an oscillatory member 196 which is compartmented similarly to the actuator mechanisms already discussed into the compartments A to F inclusive. The actuator member 196 is suspended in the upper housing section 194 at the pivotal support points 198 and 200. The level of the liquid 50 in the lower section of the housing 180 engages the perimeter of the upper section 194 and receives the reciprocable member 196 in sealing relation. The inverted cup-like upper section 194 is divided into two volumes by the fixed partition 202 which is shaped to embrace the right half of the reciprocable member 196 in sealing contact with the liquid volume. In addition to the drier 40 connection to admit air under atmospheric pressure to the left half of the upper section, a conduit 204 connects the separated right half volume under the partition 202 and adjacent the member 196 with the positive negative operating source pressures such as are present in the storage tank with which the device is operating.

A comparison of the oscillatory actuator member 196 as shown in Figures 13 through 16, shows it suspended pivotally within the upper housing section 194 in operating relation with the right and left volumes as partitioned by the divided wall 202. This member 196 is shaped to avoid interference with the partition 202 and is changed slightly in section from the actuator members already discussed. The compartments A, B, C on the left and D, E, F on the right are retained in the same relative positions to receive and operably cooperate with the conduits 42, 44, and 46, as previously described. However, the partitions forming the compartments in this member 196 are slightly modified to accentuate the operating characteristics as will be later evident in describing the relative operations of these actuator sub-assemblies.

For example, the end pieces 100 and 102 of the member 196 are, in this modified form, limited by the cover plates 108 and 110. The partitions 106 and 112 are shortened and extended downwardly from the cover plates to enter the liquid and form a receptacle into which the partition 202 extends. The linking section 206, tying partitions 106 and 112 together, is solid in this form and permits the liquid 50 to flow from the ends of member 196 into sealing contact with the dividing partition 202. A further change is noticed in Figure 13 where the inner partitions 114 and 118 project into the liquid the full depth of the outer walls 104 and 116. The partition 118 extends longitudinally to include compartments B and C but not A, while the partition 114 includes compartments E and F but not D. Compartment A opens as shown (Figures 2, 10 and 14) into the left half of the actuator element 196, while chamber D is shaped by partition 208 with opening 210 to receive atmospheric pressure from the right half of the member through conduit 182 soon after it begins to rotate upwardly. This is shown in section in Figures 13 and 15 and also in 16.

Figure 16:
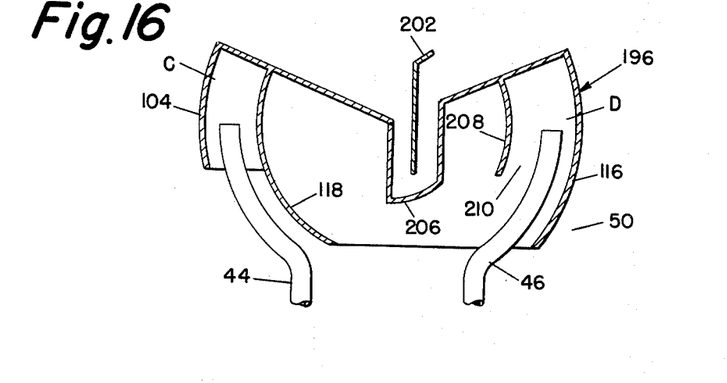
Figure 16 is a sectional elevation of the actuator member along lines 16—16 of Figure 14.

The inner partition 118 is limited in full depth to only compartment C being shortened to the depth of partition A—B for compartment B and eliminated for compartment A as shown in these figures. The shoulder 212 and the aperture 210 which opens freely into compartment D, in the outer wall plate 104 and the inner partition 114 respectively, are acceleration devices for increasing the speed of movement under both pressure and vacuum conditions. The acceleration shoulder 212 extends along compartments A and B but does not include compartment C. The partition 104 (Figure 16) is shortened in depth of penetration in the liquid at compartment C as is also the end partition 102 to facilitate the early entrance of air under atmospheric pressure as the member pivots from the liquid in a clockwise direction. This structure of the partitions 104 and 102 is shown in Figure 16 as is, also, the aperture 210 formed by partitions 208 and 114 opening into compartment D. The reasons for the modifications in structure, covered briefly here, will be fully explained and understood after reading the description of the operation of these assemblies later in this specification.

The next four figures 17 to 20 inclusive, as indicated above, illustrate a compact device in which the elements and sub-assemblies described are arranged closely together to comprise a package unit. In this arrangement, the actuator 250 in any one or combination of the forms described above, is illustrated diagrammatically with the atmospheric drier 40 connected thereto. The conduits 42, 44 and 46, filling the same purpose as described in connection with the actuators above, are connected respectively to transmit storage tank pressures to the actuator, and to reverse the operating pressures between the actuator and the pressure responsive mechanism 252 mounted inside the valve housing 30.

Figure 18:
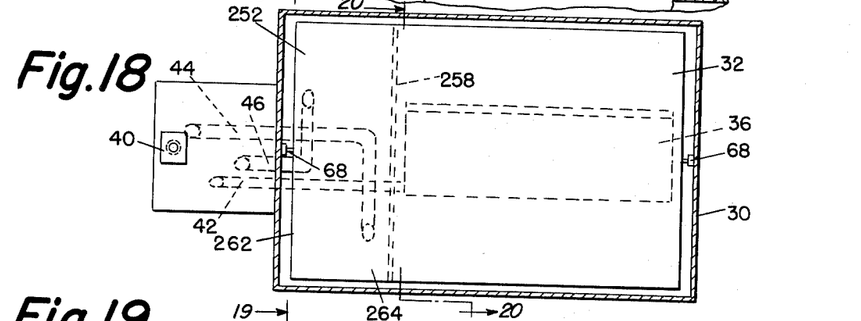
Figure 18 is a plan sectional view of Figure 17 along lines 18—18.
Figure 19:
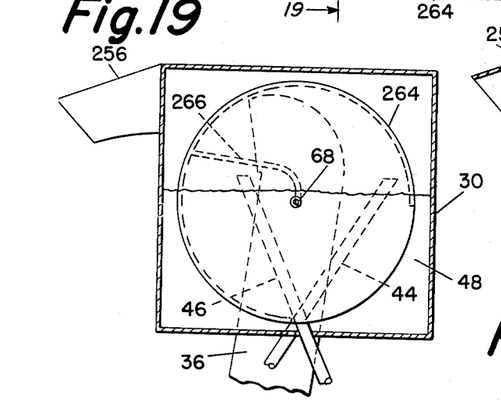
Figure 19 is a sectional elevation of Figure 18 along lines 19—19.
Figure 20:
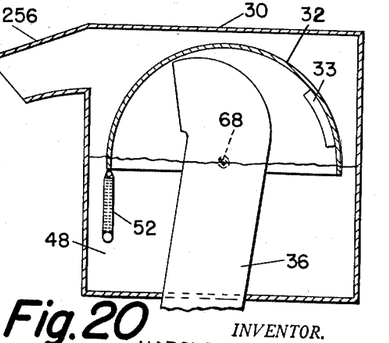
Figure 20 is a sectional elevation of Figure 18 along lines 20—20.

To facilitate mounting on the storage tank 34, the device is securely fastened to the flue or gas venting conduit 36 which, in turn, is readily secured to a comparable opening in the tank, usually through a manhead 254. The conduit 42 for transfer of tank pressures to the actuator is connected to this flue 36 above the tank thereby avoiding another tank opening. The flue 36 extends upwardly through the sealing liquid 48 to a point above the liquid level and under the semi-cylindrical valve member 32 as above described in relation to Figures 2 and 3 and illustrated here also in Figures 18 and 20. The flue is curved to direct the pressure relieving gases through the valve mechanism as shown in Figures 19 and 20. The curving of the flue channels the gas for interception by the flame arrester 52 which also forms an important sub-assembly of this device. A counterbalance such as weight 33 is used to position the valve member 32 in the neutral position, thus overcoming the effect of the suspended flame arrester 52 as shown in the sectional view of Figure 20. The housing 30 is covered to prevent rain, snow, and wind from interfering with the operation of the valve member and includes a hooded vent 256 shaped to permit the free passage of pressure relieving gases in both directions, but prevent the effects of the weather elements. This is similar to the cover 70 and opening 72 of the housing 30 shown in Figure 3, and is adapted for the same purposes.

As a modification of the chamber 62 and piston 64 arrangement shown in the originally detailed embodiment (Figures 2 and 3), the pressure responsive mechanism 252 is in the form of a cylinder extending from and attached to the semi-cylindrical valve member 32. The dividing partition 258 between these joined oscillatory elements is common to both and is a full circle in area. The end plate 260 of the valve member between which and the dividing partition 258 the semi-cylindrical valve 32 is mounted, need be little more than half a circle with the pivotal bearing placed properly as at 68 (Figures 2 and 3). The remaining end plate 262, forming the closure for the pressure responsive unit 252 on the end of the valve member should, like the partition plate 258, be a full circle supporting a like pivotal bearing 68. The cover plate 264, however, of the responsive unit 252, does not entirely close that member by following the periphery of the two circular plates on its ends. A pie-shaped segment always submerged beneath the sealing liquid, is open to receive the conduits 44 and 46 which project through the housing 30 and into the pressure responsive assembly 252 venting above the liquid level, as in Figure 19.

Between the pressure transmitting conduits 44 and 46, extending from the cover plate 264 on the periphery of the pressure responsive device 252, to the center of the axis of the pivotal support and into sealing engagement with the liquid, a baffle 266 is arranged. This baffle 266 extends across the full width of the member 252 and seals the separate volumes in contact with the conduits 44 and 46 by full and complete engagement with the circular end plate 262, the circular partition plate 258, the cover plate 264, and penetration into the sealing liquid 48.

A detailed discussion of the operation of the preferred embodiment with brief references to the alternate structures of the sub-assemblies, elements, and combination arrangements, will clearly indicate the spirit and scope of the invention. Basically, those versed in the art will recognize the broad principles governing the operation of the disclosed structure to be the distribution and application of pressures to a responsive mechanism and reversing these pressures so as to always direct the greater of them in opposition to the lesser in one direction. The problem requires that both positive and negative (vacuum) pressures, as referred to atmospheric pressures, be considered. Atmospheric pressure as a third force is immediately available at all times, and is used by the inventor to facilitate the operation of the device. Simply stated, the apparatus forming the improved device includes a means for selecting and directing the proper pressures in operating relation to the responsive venting mechanism. By directing the pressures to use the greater of the two available positive pressures through the actuator to force the pressure responsive mechanism to oscillate in one direction, the advantages of design and operation outlined are made available. Concentrating the elements and features of design which lend to the precision response of the combination in the actuator and pressure response mechanisms and removing them from the valve member enables control at predetermined pressures to be established and maintained. It is possible, therefore, to make and position a balanced valve member immediately responsive to the actuating pressures and to nothing else.

The two remaining figures in the drawing, namely 21 and 22, illustrate operating positions of the combination of the complete assembly selected as a preferred form for use in both pressure venting and vacuum relief operations. Considering first the pressure venting operation, attention is directed to Figure 21. This figure, which is the sectional elevation shown in Figure 3 (the neutral position) with the movable members indicated at the point of maximum oscillation, is used as the most applicable view illustrating operation. It is repeated in Figure 22 showing the position for relieving a vacuum condition. Reference will be made also to Figure 2 as well as to other figures representing similar views in alternate structures to complete the description. The operation of the actuator mechanism will be discussed first in detail as it initiates all further action, the valve being always in balance, and may be used separately as a sub-combination for actuation of any selected pressure operated mechanism, for signaling, relief, valve operation, or the like.

Figure 21:
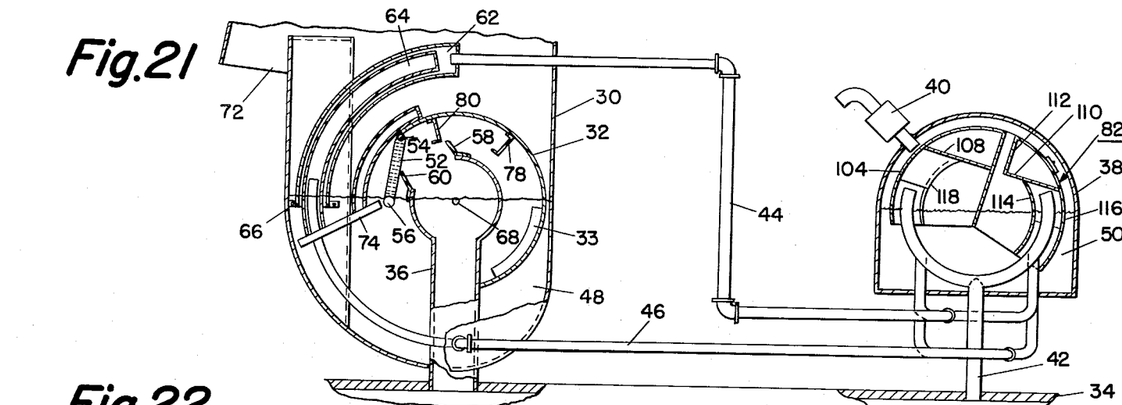
Figure 21 is a sectional elevation showing operation under pressure conditions.
Figure 22:
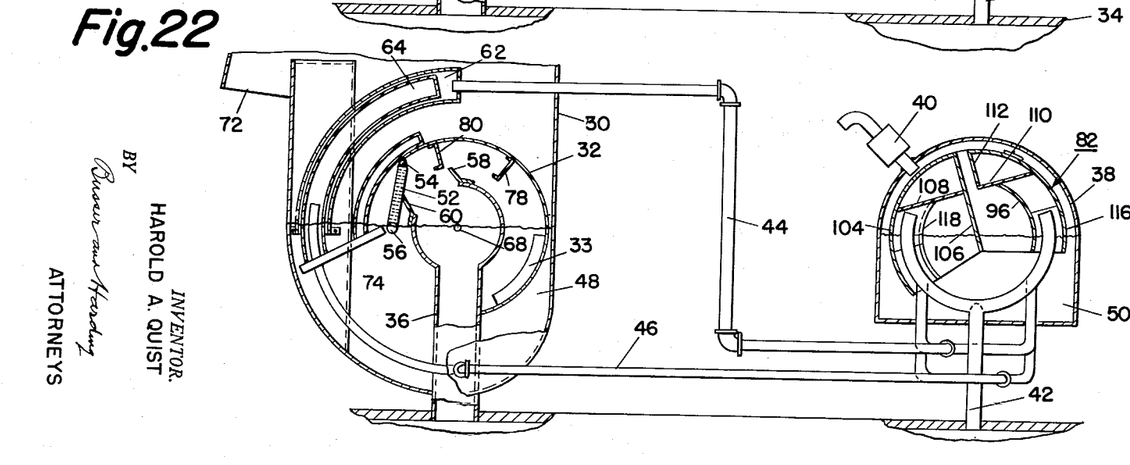
Figure 22 is a sectional elevation showing operation under vacuum conditions.

Referring now to Figure 21, the actuator housing 38 is shown enclosing the compartmented actuator member 82 pivotally mounted therein. The sealing liquid 50 is maintained at a level sufficiently high to engage the actuator member as shown. Air at atmospheric pressure is admitted to the enclosed upper portion of the housing 38 above the liquid level through a drier 40 which contains any well-known desiccant to remove moisture and other foreign matter from the incoming air. This precaution is primarily taken to prevent freezing of condensate in the actuator housing resulting in obstruction of operation. Needless to point out, the drier 40 and its connections to the atmosphere should be placed and directed to refuse the entrance of rain and snow. The conduit 42 is connected to the vapor space of storage tank 34 to freely transmit the internal tank pressures, either positive or negative as defined or neither as illustrated in the neutral position (Figure 3), to the divided conduit entering compartments A and F of the actuator member 82. The admission of a positive tank pressure through this conduit 42 to these compartments urges the actuator member 82 to rotate in a clockwise direction because the responsive volume on the left of the member bounded by the partitions 100, 106, 108, and 118 and that of compartment A as shown in Figure 2 is so much greater than the small volume of compartment F to which the right branch of the conduit 42 is directed and confined.

The greater volume and more effective area outlined is increased by the transfer of the pressure to the compartment B (Figure 2). This transfer is made under the partition A—B which is above and not in contact with the sealing liquid as shown in Figure 4. As a result of this unbalance of pressure, when an excessive positive pressure is created in the storage tank, the actuator member oscillates in a clockwise direction limited by contact with the conduits 44 and 46 shown in Figure 21. In this rotated position, the compartment C (Figure 2) has lifted from the liquid disengaging the outer cover 104 shown as shortened by the dotted line in Figure 4, and admits air at atmospheric pressure to this compartment C and to the conduit 44 opening into it from the inside of the actuator housing 38.

To the right of medial partition 106, the partition 112 forms an aperture for the admission of air at atmospheric pressure to the right central volume of the actuator member. This atmospheric pressure does not, however, prevent the clockwise rotation of the member 82 as the sum of this pressure and the force of tank pressure in compartment F (Figure 2) is not great enough to withstand the effect of the positive tank pressure in the left half of the central volume augmented as noted above by the same pressure existing in compartments A and B. The rotation in the clockwise direction moves the short divisional partition E—F, comparable to the compartment division A—B (Figures 4 and 5), downwardly into contact with the liquid as well as submerging the foreshortened length of the outer cover 116 adjacent compartment D to a greater depth. The result of this movement is to seal the branches of the conduits 42, 44, and 46 which extend into the compartments D, E, and F on the right half of the actuator mechanism. The entire right side is thus inactivated.

Considering again the lifted left half of the actuator member, which is the operative position selected for pressure venting conditions in the embodiment under discussion, the positive tank pressure transmitted to compartment A moves into compartment B (Figure 2) and, being blocked from escape through the right branch by the sealed condition of compartment D, thence out through conduit 46 to the responsive mechanism connected to the oscillatory relieving valve. The compartment C now receiving air under atmospheric pressure from the peripheral space within the actuator housing 38, yet separated from the tank-positive pressure condition existing in compartments A and B, transmits atmospheric pressure through conduit 44 to the same responsive mechanism. This is an unbalanced pressure condition which causes movement of the respective responsive members and in turn reciprocates the valve member as will be explained.

The pressure relief condition discussed in its effect on the actuation device up to this point, will be continued to include the operation of the oscillatory valve member and relief of the storage tank positive pressure. In this way, the full understanding of this operation will be clear and not interrupted with discussion of alternate devices or reverse processes. Later, these modifications and the conditions of operation caused by vacuum relief can be understood largely by reference back to this closely detailed pressure operation.

Continuing, therefore, with reference to Figures 2, 3, and 21, the actuator member 82 having oscillated in the clockwise direction to the maxium point of rotation for pressure relief from the neutral position in response to tank pressure, the left half being partially lifted from contact with the sealing liquid 50, the operating pressures are transmitted through conduits 44 and 46. Conduit 44 is transmitting air at atmospheric pressure from the actuator housing through compartment C to the chamber 62. The increased pressure from the tank, over and above normal non-operating pressures, is passed through conduit 46 by way of compartments A and B to the piston 64. There is, consequently, an unbalanced pressure condition between the piston and the chamber enclosing it which drives the piston upwardly into the chamber, clockwise in direction about the pivotal center 68 of the valve 32. As the piston is connected to the oscillatory valve member 32 by the brackets 74 and 76, the valve member is also rotated in this direction.

It is noteworthy to indicate that the points of pivotal suspension 68—68 for the valve member 32, axially balance this member in alignment with the transverse center of the flue or relief gas conduit 36. The design of the oscillatory valve member 32 is directed to balancing the flame arrester 52 and the baffles 78 and 80 by adding to the weight of the member to the right of the pivotal point. This is symbolized by using the weight 33 as shown, but may be accomplished in any preferred way. As the valve member is thus balanced and centrally positioned over the flue 36, it is undisturbed by the tank pressures delivered through the flue to the under side of the semi-cylindrical valve body. It depends for oscillation on the movement of the piston in the chamber which, in turn is directly controlled by the tank-pressure responsive actuator.

The baffles 58 and 60, mounted to deflect the direction of the relieving gas flow most advantageously, are also arranged to cooperate with the baffles 78 and 80 on the inner face of the reciprocable member 32. As the baffles 78 and 80 are positioned as the valve stands inoperative in Figure 3, the excessive tank pressures, positive or negative, fill the space beneath the valve member and above the surface of the sealing liquid. It is evident that the pressure is, in the neutral position, equally distributed inside the valve member and on all sides of the baffle surfaces. As the valve member 32 begins to rotate, prompted by the movement of the pressure responsive piston 64 in a clockwise direction, the baffle 78 moves into proximity with the fixed baffle 58 just clearing it and receives the impetus of the velocity head of pressure of the escaping gases as the gas starts to escape around the second moving baffle 80 not yet in contact with the fixed baffle 60 and around the trailing edge of the valve member 32 to which the hinged flame arrester 52 is attached. Further rotation moves both baffles 78 and 80 beyond their respective fixed baffles 58 and 60 and adds the impetus given to baffle 80 to the oscillating movement. The motion of the valve is thus accelerated to the open position by this added baffle arrangement for the pressure relief operation.

Further, it will be understood that the flame arrester 52 hinged to the valve member 32 at 54 and weighted at 56 to remain always vertical and in contact with the liquid, assumes a complete flame obstruction across the path of the flowing gases. As here shown and arranged, this flame arrester, in the valve's neutral position, is always submerged in the sealing liquid. As the valve responds to pressure and vacuum relief, always rotating in a clockwise direction as will be fully understood after describing the vacuum relieving operation, a washing action takes place which removes insects, dirt, and gums, and prevents the formation of ice.

A description of the device in its now considered form, using these same Figures 2, 3, 4, 5, 21 and 22, as it operates to relieve vacuum or negative pressures arising in the storage tank as opposed to positive pressures, will now be given. Again, the operation will be detailed beginning with the actuator as it is shown in the neutral position in Figure 3. The layer of air within the housing between the inner surface of the actuator housing 38 and the actuator member 82, is always there as established above, freely entering through the drier 40. As described above also, this atmospheric pressure occupies the right half, central position of the actuator member 82 between the partitions 106 and 114, and the end walls 100 and 102 (Figure 2). Therefore, as the vacuum condition of the storage tank is transferred through the conduit 42 to compartments F and A enlarged, an unbalance of pressure results in favor of the right half under atmospheric pressure and the actuator oscillates to the left or counterclockwise direction as shown in Figure 22. Momentarily, there is a transfer of the tank's negative pressure condition to compartment B and conduit 46 (Figure 4), but this stops as soon as the separating partition A—B contacts the sealing liquid. With the entire left half of the actuator 82 moving downward into sealing contact with the liquid 50, the compartments A, B, and C and the branching ends of the conduits 42, 44, and 46 projecting into them become inactivated.

The right half of the counterclockwise revolved actuator member 82, however, has lifted partly from the liquid and exposes shortened sections of the partitions and end walls to communicate with other pressures which in turn are transmitted through conduits 44 and 46 to operate the valve member 32. Initially there is communication between compartments E and F under the shortened partition E—F (Figures 2 and 5) by which the vacuum of the tank is transferred between conduits 42 and 44. Further the lift of the right side exposes compartment D to an inrush of dried air at atmospheric pressure from the inside of the actuator housing to pass through conduit 46 to the pressure responsive mechanism in the valve housing 30.

The relief of the vacuum condition as it takes place through the housing 30 of the oscillatory valve member 32 and the relief conduit 36, can now be described. The conduit 46 through the compartment D (Figure 2) is transmitting atmospheric pressure to the piston 64. Opposed to this pressure in the piston, is the vacuum or negative pressure condition transferred through conduit 44 from compartment E as it is received from the right branch of conduit 42 projecting into compartment F. Again there is an unbalance of pressure in favor of the piston side, and the piston 64 moves up into the chamber 62 carrying the valve member 32 in clockwise rotation with it. The flame arrester follows as above described, and is equally well maintained and effective under vacuum conditions as for pressure conditions and their relief. To those versed in the art, the fixed baffles 58, 60 and the movable baffles 78 and 80 are effective, receiving the accelerating impetus from the incoming relieving gas or air as contrasted with the outgoing or escaping gas of the pressure condition described above.

Before leaving the detailed embodiment to describe the operation of the alternate structures and discuss the various advantages of this device over the art, there is a movable weight 150 and relatively fixed weight 156 cooperating with the actuator member 82 which should be discussed for further clarification of the positive action of the combination. The movable weight 150 is positioned within the actuator housing as shown in Figure 2, to rest on a knife edge bearing 86 of the pivot of rotation on one end and extends to the left half in the disclosed form to contact two peg supports 152 and 154 near the periphery of the semi-cylindrically shaped actuator member 82. The support 152 is connected to the housing and is permanently fastened in place. Support 154, however, is a part of the oscillatory actuator member 82 and moves therewith. It is evident, therefore, that as the actuator member reciprocates in the clockwise direction to vent pressure conditions the weight 150 is lifted in rotation about the axis of suspension and acts also to return the actuator member to the neutral position.

Under vacuum relief conditions, the weight 150 is supported on the fixed supports 86 and 152 while the actuator member rotates in a counterclockwise direction. Effective in this instance is the comparatively fixed weight 156 which can be adjusted toward or away from the vertical center line to balance the actuator 82. Properly positioned it never passes beyond the vertical center line in counterclockwise rotation but is maintained to the right thereof with an effective and increasing lever arm assisting in return to the neutral position in a positive fashion after vacuum relief operation.

The description of the physical details of the alternate forms of the actuator device as shown in the two groups of Figures 8 to 12 and 13 to 16 each inclusive, considered in conjunction with the preceding description of the operation of the detailed embodiment of the device will clarify their operation. However, to indicate what is believed to be desirable modifications and consequently necessary contributions to the art, these two forms will be described in detail sufficient to relate them to the previously described apparatus.

Figure 6:
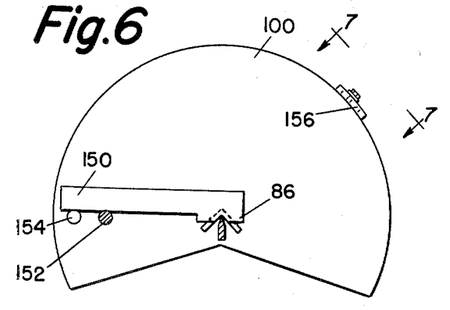
Figure 6 is an end detail of the actuator member.
Figure 7:
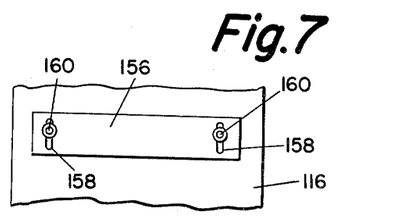
Figure 7 is a detail along line 7—7 of Figure 6.
Figures 10, 11, 12:
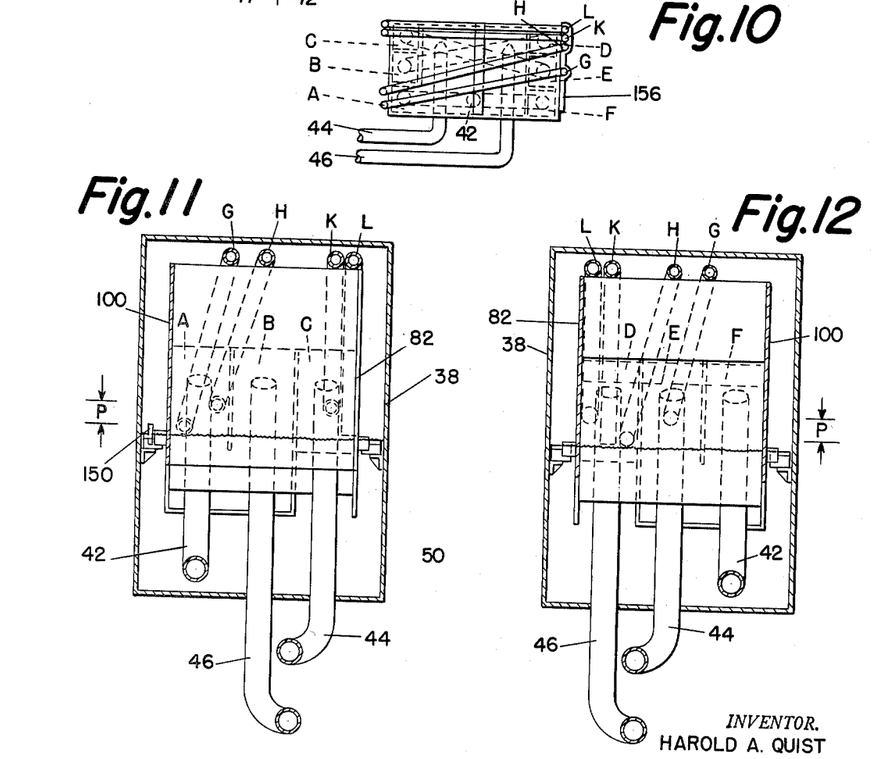
Figure 10 is a plan view of the actuator of Figure 8 removed from the housing.
Figures 11 and 12 are elevational views of Figure 8 taken along lines 11—11 and 12—12.

The first alternate form of actuator is shown in Figures 8 to 12 which retains with few exceptions the structure fully described above. The weights 150 and 156 of detail Figures 6 and 7 are included in this device and are indicated in Figures 10 and 11 but otherwise omitted for clarity. A further modification, indicated above, is made in the separating compartment partitions A—B, E—F, which are lengthened to contact the sealing liquid in contrast with the shorter partitions of the same designation shown in Figures 4 and 5. In addition four tubes, G, H, K, and L have been added and arranged to transfer pressures between selected compartments resulting in a balanced positive operation to a high degree.

As explained above, in the detail of this alternate form of actuating mechanism, the venting of an excessive pressure condition from the storage tank is begun by transmitting that varied pressure through the conduit 42 from the tank to compartments A and F. Instead of immediately responding as did the actuator of Figures 2, 3, etc., this increase of pressure is transferred through tubes G and H from compartment A to compartments E and D and thence to conduits 44 and 46. This transfer places equal pressures in all conduits and the valve member 32 is thereby maintained in the neutral position by the balanced pressures in the pressure responsive mechanism noted here as piston 64 and chamber 62.

The balanced pressure condition remains until the tank pressure reaches a force in excess of the allowed tolerance or "play" built into the device by the respective elevations of the opposite ends of the tubes, (shown as P on the Figures 11 and 12), and is sufficiently in excess of this tolerance to rotate the actuator member 82 to seal the elevated ends of these tubes by submersion in the liquid. Continuing the pressure venting operation, clockwise rotation will lift the left half of the actuator and move the right half deeper into the liquid. As the right half moves downwardly the lower end of tube H is first sealed shutting out the pressure exchange to compartment D and the attending branch of conduit 46. Further rotating movement submerges the elevated end of tube G where it enters compartment E and removes the exchange of tank pressure to that branch of conduit 44. At this point in the operation the excessive tank pressure passed through conduit 46 is suddenly asserted as the dividing compartment partition A—B clears the liquid and the tank pressure passes freely to the left branch of conduit 46 through compartment B.

There has been maintained throughout the neutral position and the initial rotative or "play" movement of the actuator member a balanced atmospheric pressure exchange between compartments C and D as transmitted through the tubes L and K. These are arranged to maintain a free pressure exchange until the built-in tolerance difference P is overcome and the final movement of the actuator is undertaken when, in the presently explained pressure venting operation, the conduit 46 transmits tank pressure and atmospheric pressure is admitted freely to conduit 44. Reference to Figure 20 will show the effect the transmission of these unbalanced pressures on the valve member 32 through the pressure responsive mechanism which is the result of the operation of this alternate form of actuator when substituted for that device already described at length.

The initial operation of the actuator in Figures 8 to 12 inclusive for vacuum relief finds the atmospheric pressure in the right half of the oscillatory member 82 of sufficient force to overcome the reduced pressures in the left side. The excessively reduced pressure is distributed from compartment A through the tubes G and H to the compartments E and D and thence to the piston 64 and chamber 62 through conduits 44 and 46 maintaining the valve member 32 in balance until the predetermined operating vacuum is reached. Again this differential is established in the measurement of P as described above for positive pressure release. As the actuator member 82 rotates in a counterclockwise direction in response to the action of the greater force on the right half of the interior, the tube G is inactivated first by submerging in the sealing liquid which momentarily disconnects conduit 44. However, as the rotation of the actuator continues the separating partition E—F, lifts from the liquid contact and the full vacuum condition of the tank vapor space is transmitted from conduit 42 to conduit 44 through compartments F and E and thence to the chamber 62.

The difference in the relative heights of contact P between tubes G and H as they enter compartment A has maintained tube H effective in transmitting the excessively negative pressure or vacuum to compartment D and thence through conduit 46 to the piston 64. Consequently there is a brief period of time in which the piston is restrained in operation. The continued counterclockwise rotation of the actuator, however, admits atmospheric pressure from the interior of the housing into compartment D and thence to the piston 64 through conduit 46. This atmospheric pressure drives the piston upwardly in the chamber 62 against the vacuum condition and causes the valve member to operate promptly and positively.

As the compartments A, B, and C are sealed by the liquid 50 the cross-connections of tubes K and L and the left branches of conduits 42, 44, and 46 are at this time ineffective. As the relief operation concludes and the sustaining operating pressure is overcome the actuator member returns to the neutral position shown in Figure 8. It is evident that an exchange of pressure conditions between the compartments again takes place which balances the piston and chamber of the pressure responsive mechanism promptly and positively returning the valve member 32 to the neutral position. This transfer of pressure between the actuator compartments before and at the end of the relief operations maintains and restores the balanced valve to the neutral position giving a very positive action within narrow pressure and vacuum limits. The weights 150 and 156 indicated as part of the actuator device, it will be understood, have operated to the same purpose and with the same results as above described with the actuator as shown in the Figures 1 to 7 and 20 and 21.

The second alternate form of actuator is illustrated in the group of figures numbered 13 to 16 inclusive. This shows a subassembly adapted for precise and positive response at preselected excessive pressures with features for added impetus in relief response. In addition to retaining the weights 150 and 156 arranged to respond to the oscillatory rotation of the actuator member 196 (Figure 13), this specie introduces acceleration means for both pressure and vacuum response, shown in the shoulder 212 and the aperture 210. Although the weights 150 and 156 are used as described with this alternate device they are omitted from the views of this sub-assembly and will be referred to briefly in the discussion of the operation and then to indicate only that they assist the actuator member as has been disclosed in the operation of the forms already described.

Figure 13:
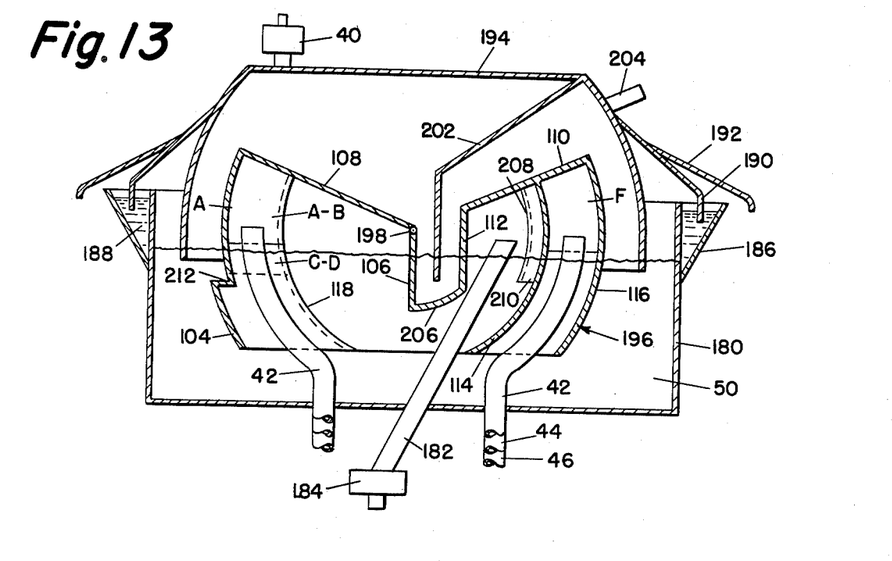
Figure 13 is an elevational section view of another form of actuator along lines 13—13 of Figure 14.

Under normal operating conditions when the actuator member 196 is in the balanced position as shown in Figure 13, the upper portion of the cover section 194 is at atmospheric pressure admitted through the familiar drier 40. This volume of the cover section 194 under atmospheric pressure is separated by the medial partition 202 from a volume thereunder maintained at tank pressure through the conduit connection 204. In addition to the conduits 42, 44, and 46 which form the pressure transmitting means for the above described combinations used here in the same way, the conduit 182 and the protecting drier 184 admit air under atmospheric pressure to the right half of the actuator member exclusive of the compartments D, E, and F. Thus the right half of the device has both tank and atmospheric pressure opposing the partition 110 of the actuator member.

Figure 14:
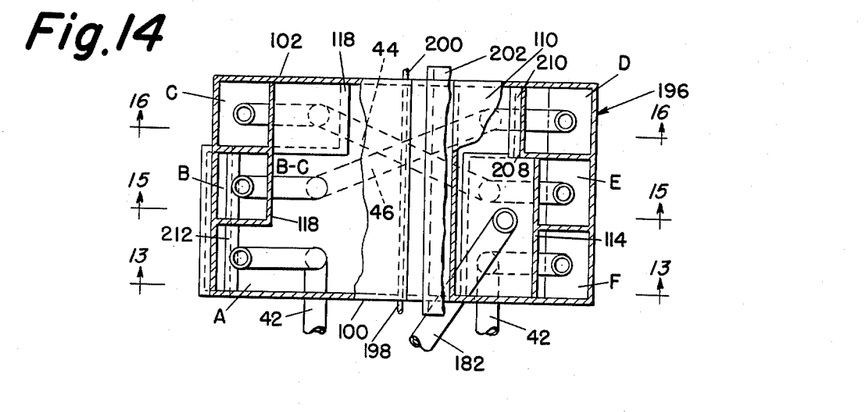
Figure 14 is a sectional plan view of the actuator member removed from the housing.
Figure 15:
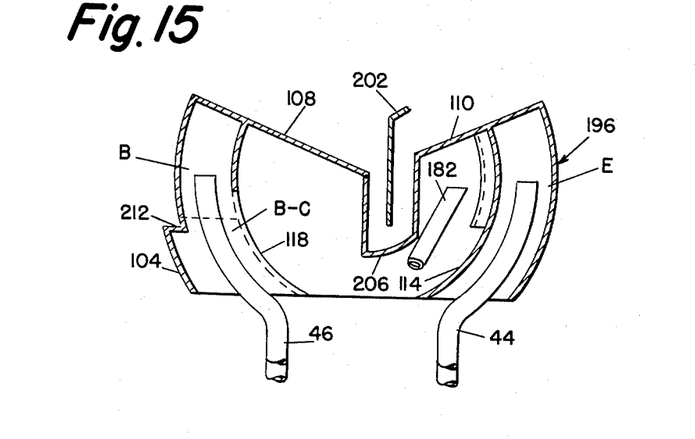
Figure 15 is a sectional elevation of the actuator member along lines 15—15 of Figure 14.

With the neutral or normal position established, an excess pressure condition is considered as admitted through the conduit 42 to the enlarged compartment A and the normally restricted volume of compartment F. At the same time, this same pressure is admitted to the right volume of the cover section under partition 202 and directly affecting the top of partition 110 of the actuator member 196. It is evident that these two components of force form a couple acting in a clockwise direction about the axis 198—200 (Figure 14) and urge the rotation of the member in a clockwise direction. The dividing partition A—B is not in contact with the sealing liquid in the neutral position (Figure 13) and therefore permits this pressure condition to transfer immediately to conduit 46 and be passed through to the piston 64 (Figure 21). The simultaneous downward movement of the right half of the actuator seals the respective compartments and the relative branch ends of the conduits which project into them. Compartment C having relatively short partitions 104 and 102 (Figure 16) is quickly opened to the introduction of the atmospheric pressure filling the left side of the cover section 194 but is prevented from mixing pressures with compartment B by the depth of the separating partition B—C (Figure 15). Thus atmospheric pressure is made available to the chamber 62 through conduit 44.

As the actuator member 196 rotates in a clockwise direction under the effect of the excess of tank pressure, the shoulder 212 is lifted until it rises above the liquid level. It then increases the effective area for the operation of the pressure and adds an impetus to the action accelerating the oscillatory movement and rapidly moving the actuator to the end of the rotative position. This shoulder extends longitudinally of the member only through the compartments A and B and does not enter compartment C as shown in Figure 14. Upon exhaustion of the excess pressure condition, the actuator member returns to the normal position assisted by the weight 150 as previously noted.

Where a vacuum condition exists, the relatively negative pressure is transmitted to compartments A and B as well as the volume above the actuator but under partition 202 as described for the pressure condition. The presence of atmospheric pressure above the left half of the actuator and in a large section of the right half as admitted by conduit 182 establishes a force couple to rotate that member in a counterclockwise direction. The dividing partition E—F between these compartments is similar to A—B (Figure 13) and permits the vacuum condition to be transferred immediately to compartment E and through conduit 44 to the chamber 62 (Figure 22). Partition 114 however separating the volume of the actuator which receives conduit 182 from these compartments E and F extends downwardly far enough to remain in the liquid at all times. The counterclockwise rotation disengages the compartments A, B, and C by submerging the left half of the member and seals the branch ends of the conduits projecting into them.

The acceleration device for the vacuum operation includes the partition 208 and the aperture 210. Partition 208 separates compartment D from the tank pressure volume under partition 202 at all times but permits air at atmospheric pressure from conduit 182 to enter the aperture 210 into compartment D as the member 196 rotates counterclockwise. The atmospheric pressure is then transmitted through conduit 46 to the piston 64 and operates the valve member 32 as shown in Figure 22. The admission of the atmospheric pressure to the added area of compartment D lends a new impetus to drive the actuator into operating position very rapidly. After the vacuum relief is affected, the weight 156 is effective, as described above, in returning the actuator to the normal position.

Figure 17:
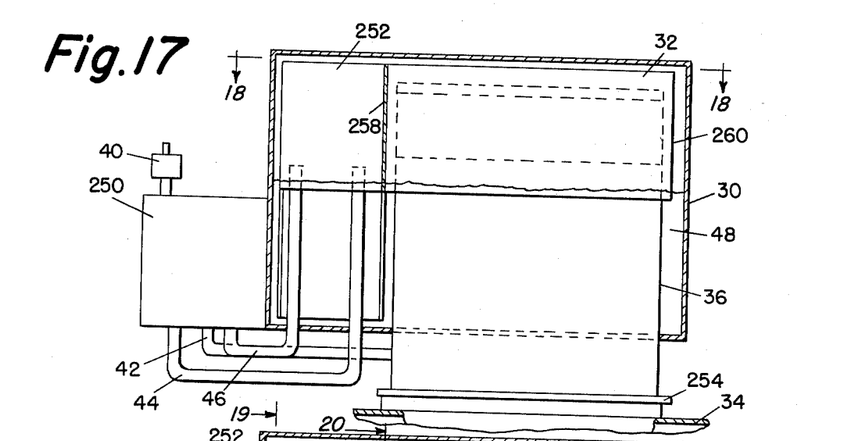
Figure 17 is an elevational section view of a unitary assembly with alternate construction detail.

The complete combination of a balanced relief valve, a pressure responsive mechanism and several forms of actuators for interchangeable use therewith has been discussed in detail. In the originally described combination the valve member with attached responsive mechanism was separated from the chosen actuator and indicates the possibility of several devices being operated from one actuator. The separation of the sub-assemblies indicated here is not always practical and a closely coupled device using these elements in simpler form is illustrated in Figures 17 to 19 inclusive. The actuator shown diagrammatically as numeral 250 may be any one of the illustrated forms or a combination of them selected to accentuate their special characteristics.

Which ever actuator means is used, the selected greater pressure either tank or atmospheric is introduced to the pressure responsive mechanism 252 through the conduit 46. The lesser pressure either atmospheric or vacuum respectively is introduced through conduit 44. This selected pressure unbalance received by the pressure responsive mechanism rotates the valve member in one direction affording complete uncovering of the relief conduit and lifting the flame arrester 52 into the protective position from the body of the sealing liquid. After the tank pressure, either excess pressure or vacuum is released, the valve member returns to the neutral position as a normal movement toward balance after operation by the actuator and pressure responsive mechanism, or by positive direction of pressure directed through the connecting conduits by the actuator.

The two forms of valves and pressure responsive mechanisms illustrated and described, as distinguished from the three forms of actuators, show balanced, flame arrester equipped, valve members. In both forms the pressure responsive mechanism connected to the valve member, is the sole means for rotating that member to the relieving position. Being balanced in the neutral position and otherwise unresponsive to tank pressures, the valve returns to this position when the actuating pressure is removed. Thus as indicated in the above description, the pressure to be relieved can be used to full advantage and the valve left free of operating elements.

In considering the three forms of actuators shown, all adapted to direct the operating pressures into the selected conduit for one-way operation, it will be recognized that different response characteristics were built into them. The initially described device illustrates a form for normal operation. The first alternate form allows for pressure fluctuations within predetermined limits where a relief operation in response to each variation would be objectionable. The second alternate form is developed to give a fast relief action, once the excessive pressure or vacuum is established. That these special features, and others, may be readily applied interchangeably to these actuators, is evident. Consequently, these three basic forms have been described at length.

It will be evident that the combination of a pressure-responsive actuator and a balanced oscillatory relief valve affords many advantages over the simple breather type of valve directly responsive to excesses in tank pressures. The relief system formed by linking these sub-assemblies together permits the actual pressure relief, either excess pressure or vacuum conditions, to be controlled by a balanced valve member responsive only to the actuator and capable of fully opening the relief conduit by reason of one-way relieving rotation. Further, by directing the tank pressures and atmospheric pressures into the pressure responsive mechanism the full tank condition operates the system and none of that pressure is directed to overcoming the resistance of mechanical corrective devices attached to the valve member. Control of the valve member by the carefully protected actuator overcomes the objections of sticking or weather obstructed valves. The transfer of pressure to insure positive closure is disclosed as an important feature of the actuator and may be combined with any species of that sub-assembly shown. In all the actuating devices, they are self-contained, need no regular maintenance nor adjustments, and are sufficiently protected to be free of obstruction by weather, insects or gumming conditions. Among the many advantages both listed and evident is one of primary importance namely the elimination of lines, cords and pulleys and the substitution of tank and atmospheric pressures for the complete relief system.

The disclosure of the selected embodiment and the several species of this invention indicate the possibilities of further modifications all within the scope of the appended claims, which are, it is to be understood, the only limitations on the form or arrangements of parts herein described and shown.

I claim:

1. A pressure relief system for a receptacle comprising a vent valve operably connecting the interior of said receptacle with the atmosphere, pressure responsive means adjacent said valve, a connection between the valve and said means controlling the valve action in direct response to the movement of the pressure responsive means, an actuator means in communication with the interior of said receptacle and the atmosphere as sources of operating pressure responding to the receptacle pressures and transmitting therethrough selected relatively high and low pressures from these pressure sources, and conduit means connecting the pressure responsive means with said actuator means and transmitting the actuator means selected high and low pressures in operating relation to operate the valve.

2. A pressure relief system for a receptacle comprising an oscillatory liquid sealed vent valve operably connecting the interior of said receptacle with the atmosphere; a pressure responsive means positioned for operating engagement with said valve; a connector linking said valve and the pressure responsive means; an oscillatory liquid sealed actuator means communicating with the interior of said receptacle and the atmosphere, operatively responsive to variations in the receptacle pressures and selecting high and low relative operating pressures from the receptacle and atmospheric pressures; and high and low pressure conduit means transmitting the selected pressures from the actuator means to the responsive means for unidirectional operation of said valve under all pressure relieving conditions.

3. A pressure relief system for a receptacle comprising an oscillatory liquid sealed vent valve operably connecting the interior of said receptacle with the atmosphere; a pressure operated piston means connected to operate said vent valve; a liquid sealed actuator means communicating with the interior of the receptacle and the atmosphere having an oscillatory compartmented member positioned to sealably contact the liquid on receiving and transmitting receptacle and atmospheric pressures therethrough; a pressure inlet conduit connecting the receptacle with the oscillatory actuator member oscillating the same in response to receptacle conditions; and a pair of pressure outlet conduits connecting the compartments of the oscillatory member with the piston means, these conduits conducting the greater and lesser pressure respectively therethrough to the same portions of the piston means assuring unidirectional operation of the vent valve for all relief conditions.

4. A system for venting excess pressures in receptacles comprising in combination, a valve housing containing liquid therein, an inverted open sided valve member pivotally mounted in said housing in sealing contact with said liquid, a pressure venting conduit extending from the exterior of said housing to a point above the liquid level within said valve member, a pressure responsive mechanism cooperating with said valve member positioned adjacent said housing, connecting means extending between said mechanism and the valve member in the housing operably linking the same for pressure operation, an oscillatory pressure selecting actuator means in pressure communication with the interior of the receptacle and the atmosphere operated by receptacle pressures to arrange and transmit pressures in operating relation, and pressure conducting means extending between the actuator means and said responsive mechanism transmitting the selected pressures to operate the valve into pressure relieving position.

5. A system for venting excess pressures in receptacles comprising in combination, a valve housing containing liquid therein, a hollow semi-cylindrical valve member pivotally supported in oscillatory sealing contact with said liquid, a pressure venting conduit extending through the liquid and said housing into the valve member above the liquid level, flame arrester means pending from the valve member to wash in the liquid and lift into position across the venting conduit during pressure and vacuum relief operations, pressure operated piston means operably connected to the oscillatory valve member, an oscillatory pressure selecting actuator means in pressure communication with the interior of the receptacle and the atmosphere, operated by receptacle pressures to arrange and transmit pressures in operating relation, and conduit means connecting the actuator means and piston means to operate said valve in response to receptacle pressures.

6. The system defined in claim 5 further characterized by the pressure operated piston means including an inverted piston cylinder within the valve housing sealably contacting the liquid therein, a piston receiving actuating pressure extending into the cylinder from below the liquid seal surface and brackets connecting the piston to the valve member.

7. A system for venting excess pressures in receptacles comprising in combination, a valve housing containing a liquid therein, a hollow semi-cylindrical valve member pivotally supported in oscillatory sealing contact with said liquid, a pressure venting conduit extending through the liquid and said housing into said valve member above the liquid level, pressure operated piston means operably connected to said valve member, an actuator housing containing liquid, an oscillatory actuator means having a plurality of inverted compartments therein mounted to oscillate into sealing contact with the liquid in the housing, receptacle and atmospheric pressure transmitting conduit means in communication with the interior of said housing and said compartments, differential pressure conduit means passing the receptacle and atmospheric pressures from the actuator means compartments to the piston means in response to the pressure oscillatory movement of the actuator means operated by pressure conditions within the receptacle.

8. A pressure relieving system comprising a valve housing containing a liquid and mounted on a receptacle, a hollow semi-cylindrical oscillatory valve member pivotally suspended in the housing in sealing contact with the liquid, a receptacle venting conduit extending through the housing and liquid into the valve member above the liquid level; pressure responsive means including a closed chamber adjacent the valve housing, and a piston mounted therein for reciprocation relative to said chamber; a linkage connection between the piston and the valve member to oscillate said member in response to piston reciprocation; an actuator housing open to the atmosphere, containing a liquid and mounted adjacent the valve housing, oscillatory actuator means pivotally suspended in the actuator housing having opposed compartments in operative sealing engagement with the liquid, said compartments separated by partition means of determined depths for controlling and selectively transferring high and low receptacle pressures and atmospheric pressure therebetween at predetermined positions in the oscillatory movement of the actuator means; receptacle pressure transmitting conduit means directed to selected opposed compartments to oscillate the actuator means in response to receptacle pressure changes, high and low pressure transmitting conduit means connecting other selected opposed compartments to the piston chamber whereby unidirectional piston and valve operation are achieved for actuator operating receptacle pressure variations.

9. A pressure relieving system comprising a valve housing mounted on a receptacle and containing liquid in the lower portion thereof, a hollow semi-cylindrical oscillatory valve member pivotally suspended in the housing in sealing contact with the liquid, a receptacle venting conduit extending through the housing and liquid into the valve member above the liquid level; pressure responsive means forming a part of the valve member including a hollow cylindrical chamber open beneath the liquid surface, and a baffle therein positioned to contact the liquid and divide the upper volume thereof; an actuator housing open to the atmosphere and having liquid in the lower portion, an actuator member pivotally mounted in said actuator housing, said member having a plurality of inverted compartments uniformly disposed on opposite sides of the pivotal axis in oscillatory sealing contact with the liquid, means selectively connecting said compartments and transmitting pressures therebetween, a pressure conduit connecting selected opposed compartments of the actuator member to the receptacle, and a pair of conduits transmitting greater and lesser pressures respectively between selected other actuator compartments and the pressure responsive means thereby connecting opposite compartments alternately, directing selected pressures from the receptacle and atmosphere to the pressure responsive means and moving the baffle of said responsive mechanism in one direction for all venting operations.

10. A pressure relieving system comprising a valve housing mounted on a receptacle and containing liquid in the lower portion thereof, a hollow semi-cylindrical oscillatory valve member pivotally suspended in the housing in sealing contact with the liquid, a receptacle venting conduit extending through the housing and liquid into the valve member above the liquid level, a weighted flame arrester hinged to suspend from the valve member in washing contact with the liquid and to cover the relief conduit in the pressure venting operation; pressure responsive means forming a part of the valve member including a hollow cylindrical chamber open beneath the liquid surface, and a baffle therein positioned to contact the liquid and divide the upper volume thereof; an actuator housing open to atmosphere and containing liquid in the lower portion positioned adjacent the valve housing, an actuator member mounted to oscillate about a pivotal axis in said actuator housing, said actuator member having a plurality of inverted compartments uniformly disposed on opposite sides of the pivotal axis to oscillate into sealing contact with the liquid, said compartments connected by transfer means for receiving and transmitting receptacle and atmospheric pressures between selected compartments during predetermined oscillatory movement of the actuator member, a pressure conduit connecting selected opposed compartments in the actuator member to the receptacle, and a pair of conduits connecting selected other opposite compartments in alternate arrangement and directing the pressures in said compartments from the receptacle and atmosphere to operate the baffle in the responsive mechanism.

11. An actuator to transmit operating pressures to pressure responsive mechanisms comprising a housing containing a liquid, a vent in said housing above the liquid admitting atmospheric pressure, a valve member pivotally suspended in the housing to oscillate about its axis in operating contact with the liquid, a plurality of compartments dividing the valve member on each side of the pivotal axis, connecting means between said compartments for receiving and transmitting operating and atmospheric pressures therebetween, operating pressure inlet conduit means extending through the housing into selected compartments on each side of the axis to oscillate said member, and high and low pressure conduit means connecting selected other compartments on both sides of the axis directing, respectively, operating and atmospheric pressures therethrough in operating relation for all oscillatory motions of said member.

12. The device disclosed in claim 11 further characterized by the connecting means between the compartments including pressure transfer tubes arranged externally and peripherally of the pivotally suspended oscillatory member connecting pressure receiving compartments with pressure transmitting compartments at predetermined different elevations for actuating pressure differences prelinimary to operation.

13. The device disclosed in claim 11 further characterized by a partition dividing the volume of the housing above the liquid into an atmospheric pressure section and source pressure and vacuum sections, an additional conduit directing atmospheric pressure into the compartmented body of the oscillating member below the said source pressure section, an offset in the enclosing surface of said member suddenly increasing the response of the pressure section in oscillation, and the section responsive to vacuum operations being partially vented admitting atmospheric pressure to the responsive section to add impetus in vacuum relieving operations.

References Cited in the file of this patent

UNITED STATES PATENTS

| | | |
|---|---|---|
| 1,982,045 | Clithero | Nov. 27, 1934 |
| 2,252,174 | Glob | Aug. 12, 1941 |
| 2,264,107 | Willard | Nov. 25, 1941 |
| 2,316,649 | Jurs | Apr. 13, 1943 |
| 2,345,379 | Campbell | Mar. 28, 1944 |
| 2,591,098 | Quist | Apr. 1, 1952 |